United States Patent Office 2,752,287
Patented June 26, 1956

2,752,287

TREATMENT OF PETROLEUM RESIDUES TO OBTAIN INCREASED YIELD OF GAS OIL IMPROVED DIESEL INDEX

Frederick William Bertram Porter and Roy Purdy Northcott, Sunbury-on-Thames, England, assignors to The British Petroleum Company Limited, a British corporation No Drawing. Application March 18, 1953,
Serial No. 343,234

Claims priority, application Great Britain March 20, 1952

1 Claim. (Cl. 196—24)

This invention relates to the treatment of petroleum residues and its principal object is to enable an increased yield of gas oil of satisfactory diesel index to be obtained from such residues.

According to the invention, a petroleum residue is contacted at elevated temperature and pressure with a sulphur-resistant hydrogenation catalyst in the presence of hydrogen, whereby organically combined sulphur is converted into hydrogen sulphide, the hydrogen sulphide separated from the treated residue, and the treated residue fractionated for the recovery of a gas oil fraction.

The catalyst employed may be any sulphur-resistant hydrogenation catalyst but the preferred catalyst is of the kind consisting of or comprising the oxides of cobalt and molybdenum, either as such or in the form of a chemical compound of cobalt, molybdenum and oxygen. Thus, the catalyst may consist of mixtures of the oxides of cobalt and molybdenum together with a suitable binder, such as graphite, or the catalyst may consist of a cobalt molybdate. The catalytic agent is preferably deposited on or incorporated with a support, such as alumina.

The desulphurisation stage is advantageously effected at a temperature within the range 750–800° F., preferably at 780° F., and at a pressure in the region of 1,000 p. s. i. ga.

It has been found that satisfactory results may be achieved with space velocities up to 2.0 v./v./hr. of the liquid feedstock, although a space velocity of 1.0 v./v./hr. is preferred.

In addition to the hydrogen sulphide separated from the treated residue, a hydrogen-rich gas mixture is also separated therefrom, and this gas mixture is advantageously recycled to the desulphurisation zone at a rate of 1000–10,000 S. C. F./B. and preferably at the rate of 4000 S. C. F./B.

The invention will now be described with reference to the following example.

Example 1

A Kuwait residue representing 53% by volume on crude was passed at a temperature of 780° F., a space velocity of 1.0 v./v./hr., a pressure of 1000 p. s. i. ga. and a gas recycle rate of 4000 S. C. F./B. over a catalyst containing approximately 24% wt. $MoO_3$ and 4.5% wt. CoO on alumina. The process was continued for 100 hours.

The properties of the feedstock and product are set out below.

|  | Feedstock | Product |
|---|---|---|
| Specific Gravity, 60° F./60° F | 0.958 | 0.911 |
| Viscosity Redwood I at 100° F. in secs | 2,000 | 235 |
| Carbon Residue (Conradson), percent wt | 8.15 | 4.6 |
| Pour Point (Upper), ° F | 40 | 25 |
| Sulphur, percent wt | 3.8 | 0.97 |
| Vanadium, p. p. m | 42 | 9 |
| Sodium, p. p. m | 35 | 25 |

Distillation of the feedstock and product gave the following results, expressed as per cent weight on feedstock:

|  | Feedstock | Product |
|---|---|---|
| Gas (including $H_2S$ and $C_4$) | | 4.0 |
| Liquid to 232° C | | 3.8 |
| Gas Oil 232–371° C | 13.9 | 20.5 |
| Residue >371° C | 86.1 | 71.7 |

| Properties of Gas Oil 232–371° C. | Feedstock | Product |
|---|---|---|
| Specific Gravity 60° F./60° F | 0.872 | 0.870 |
| Sulphur, percent wt | 1.98 | 0.25 |
| Diesel Index | 48 | 48 |

| Properties of Residue >371° C. | Feedstock | Product |
|---|---|---|
| Specific Gravity 140° F./60° F | 0.946 | 0.906 |
| Viscosity Redwood I at 100° F. in secs | 8,350 | 1,220 |
| Pour Point, ° F | 70 | 60 |
| Sulphur, percent wt | 4.03 | 1.30 |

It will be noted that from the hydrofined residue there is obtained a yield of gas oil of 20.5% based on the feedstock, as compared with a yield of 13.9% from the feedstock.

Examples 2 and 3

| Process Conditions | Example 2 | Example 3 |
|---|---|---|
| Feedstock | Kuwait 53% vol. residue | |
| Temperature, ° F | 780 | 800 |
| Space velocity, v./v./hr | 0.5 | 1.0 |
| Pressure p. s. i. ga | 1,000 | 1,000 |
| Recycle Rate, S. C. F./B | 4,000 | 4,000 |
| Catalyst | 24% wt. $MoO_3$ and 4.5% CoO on alumina | |
| Duration of test | 100 hours | |

| Properties of Feedstock and Products | Feedstock | Example 2 | Example 3 |
|---|---|---|---|
| Specific Gravity 60° F./60° F | 0.958 | 0.899 | 0.9075 |
| Viscosity Red. I at 100° F. secs | 2,000 | 100 | 142 |
| Carbon Residue (Conradson), percent wt | 8.15 | 3.38 | 4.63 |
| Pour Point (Upper), °F | 40 | 10 | 10 |
| Sulphur, percent wt | 3.8 | 0.64 | 1.05 |
| Vanadium, p. p. m | 42 | 3 | 10 |
| Sodium, p. p. m | 35 | 8 | 12 |

Distillation of the feedstock and products gave the following results, expressed as per cent weight on feedstock.

|  | Feedstock | Example 2 | Example 3 |
|---|---|---|---|
| Gas to $C_4$ (including $H_2S$) | | 5.5 | 4.7 |
| Liquid to 232° C | | 7.9 | 6.3 |
| Gas Oil 232–371° C | 13.9 | 26.6 | 23.9 |
| Residue >371° C | 86.1 | 60.0 | 65.1 |

| Properties of Gas Oil 232–371° C. | Feedstock | Example 2 | Example 3 |
|---|---|---|---|
| Specific Gravity 60° F./60° F | 0.872 | 0.868 | 0.866 |
| Sulphur, percent wt | 1.98 | 0.17 | 0.28 |
| Diesel Index | 48 | 47 | 48 |

| Properties of Residue >371 ° C. | Feedstock | Example 2 | Example 3 |
|---|---|---|---|
| Specific Gravity 140° F./60° F | 0.946 | 0.912 | 0.9115 |
| Viscosity Redwood I at 100° F., secs | 8,350 | 800 | 1,100 |
| Pour Point, °F | 70 | 55 | 65 |
| Sulphur, percent wt | 4.03 | 0.96 | 1.42 |

The term "petroleum residue" as employed herein is intended to mean the residual petroleum oil resulting from the atmospheric and/or vacuum topping distillation of naturally occuring petroleum oil to remove all or some of its straight run fractions lower boiling than gas oil so that the residual petroleum oil contains all or substantially all of the gas oil content of the naturally occurring petroleum oil.

We claim:

A process of treating a petroleum residue to obtain an increased yield of gas oil of satisfactory diesel index therefrom which comprises contacting the residue at a temperature within the range of about 750 to 800° F., and at a pressure of about 1,000 p. s. i. gauge, and at a space velocity of up to 2 v./v./hr. of the liquid feedstock, with a sulphur resistant hydrogenation catalyst consisting essentially of the oxides of cobalt and molybdenum on alumina, and in the presence of hydrogen, whereby organically combined sulphur is converted into hydrogen sulphide, and separating the hydrogen sulphide from the treated residue, recovering the hydrogen rich gas mixture from the treated residue and recycling same to the desulphurization zone at a rate of between 1,000 to 10,000 S. C. F./B., and fractionating the treated residue and recovering a gas oil fraction therefrom.

References Cited in the file of this patent

UNITED STATES PATENTS

| | | |
|---|---|---|
| 2,441,297 | Stirton | May 11, 1948 |
| 2,516,877 | Horne et al. | Aug. 1, 1950 |
| 2,554,597 | Starnes et al. | May 29, 1951 |
| 2,567,252 | Strang | Sept. 11, 1951 |
| 2,606,141 | Meyer | Aug. 5, 1952 |